United States Patent
Paidi et al.

(10) Patent No.: US 11,726,713 B2
(45) Date of Patent: Aug. 15, 2023

(54) SYSTEMS AND METHODS FOR PRIORITY COMMAND DATA FETCHING MANAGEMENT

(71) Applicant: Western Digital Technologies, Inc., San Jose, CA (US)

(72) Inventors: Srinivasa Rao Paidi, Bangalore (IN); Kapil Sundrani, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/358,457

(22) Filed: Jun. 25, 2021

(65) Prior Publication Data
US 2022/0413760 A1  Dec. 29, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0688* (2013.01)

(58) Field of Classification Search
None
See application file for complete search history.

(56) References Cited

U.S. PATENT DOCUMENTS

| 5,379,381 A | 1/1995 | Lamb | |
| 5,809,278 A * | 9/1998 | Watanabe | G06F 13/18 711/158 |
| 7,293,120 B2 | 11/2007 | Giebel | |
| 7,472,206 B2 | 12/2008 | Sato et al. | |
| 7,822,885 B2 | 10/2010 | Bouvier | |
| 8,151,008 B2 | 4/2012 | Simon et al. | |
| 9,021,146 B2 | 4/2015 | Ross et al. | |
| 10,229,077 B2 | 3/2019 | Jan et al. | |
| 2012/0173786 A1 * | 7/2012 | Simon | G06F 13/28 710/308 |
| 2013/0054875 A1 * | 2/2013 | Ross | G06F 13/36 711/E12.008 |

(Continued)

OTHER PUBLICATIONS

International Search Report and Written Opinion, PCT Application No. PCT/US2022/018010, dated Jul. 27, 2022.

*Primary Examiner* — Stephanie Wu
(74) *Attorney, Agent, or Firm* — Ravi Mohan; Rutan & Tucker, LLP

(57) ABSTRACT

Storage devices are often configured to receive and process commands from a host-computing device. These commands can vary in size and priority with larger sizes of command data being processed by storage devices more frequently. As these sizes increase, more situations occur when newly received high priority commands are received and ready for processing, but must wait for the current data associated with a normal priority command to be fetched and/or processed. Traditionally, the high priority command must wait, no matter how long, until the currently underway normal priority command is fetched and/or completed. However, methods and system described herein allow for the interruption of normal priority data fetching prior to completion. In this way, lower latencies may be achieved as high priority commands are not required to wait for processing. The previously fetched data may be dumped and re-fetched again or may be stored until normal operations can resume.

18 Claims, 5 Drawing Sheets

(56) References Cited

U.S. PATENT DOCUMENTS

| | | | |
|---|---|---|---|
| 2013/0254454 A1* | 9/2013 | Ide | G06F 3/0688 |
| | | | 711/E12.082 |
| 2016/0306553 A1* | 10/2016 | Ellis | G06F 12/02 |
| 2017/0010992 A1* | 1/2017 | Sarcone | G06F 1/3275 |
| 2018/0173462 A1 | 6/2018 | Choi et al. | |
| 2018/0335976 A1* | 11/2018 | DeRosa | G06F 3/0611 |
| 2019/0081903 A1* | 3/2019 | Kobayashi | H04L 47/522 |
| 2019/0087129 A1 | 3/2019 | You | |
| 2019/0129653 A1* | 5/2019 | Yang | G06F 3/067 |
| 2020/0125297 A1 | 4/2020 | Seo | |
| 2020/0272330 A1 | 8/2020 | Chen et al. | |
| 2020/0285413 A1 | 9/2020 | Uchida | |
| 2021/0303340 A1* | 9/2021 | Li | G06F 3/0679 |

\* cited by examiner

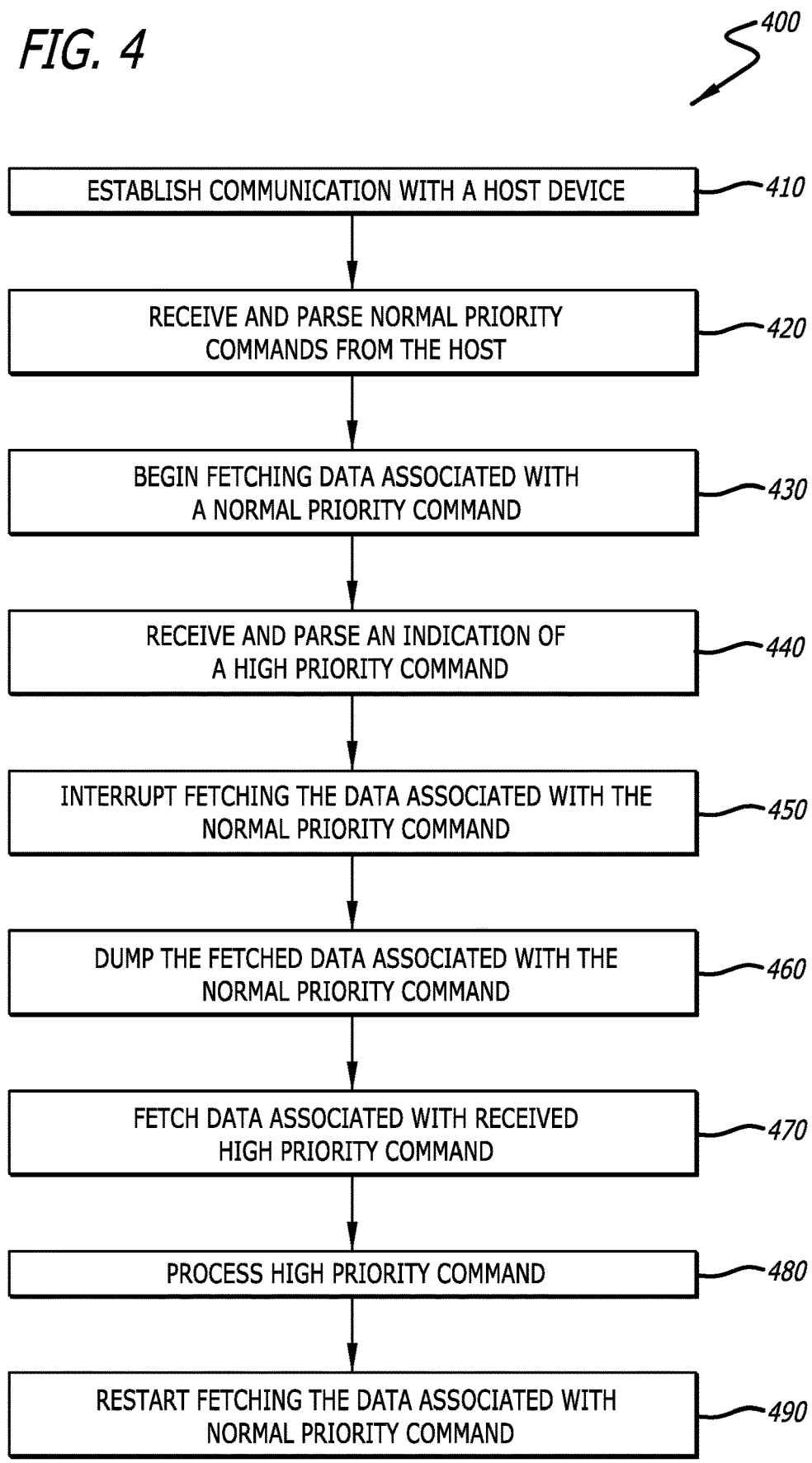

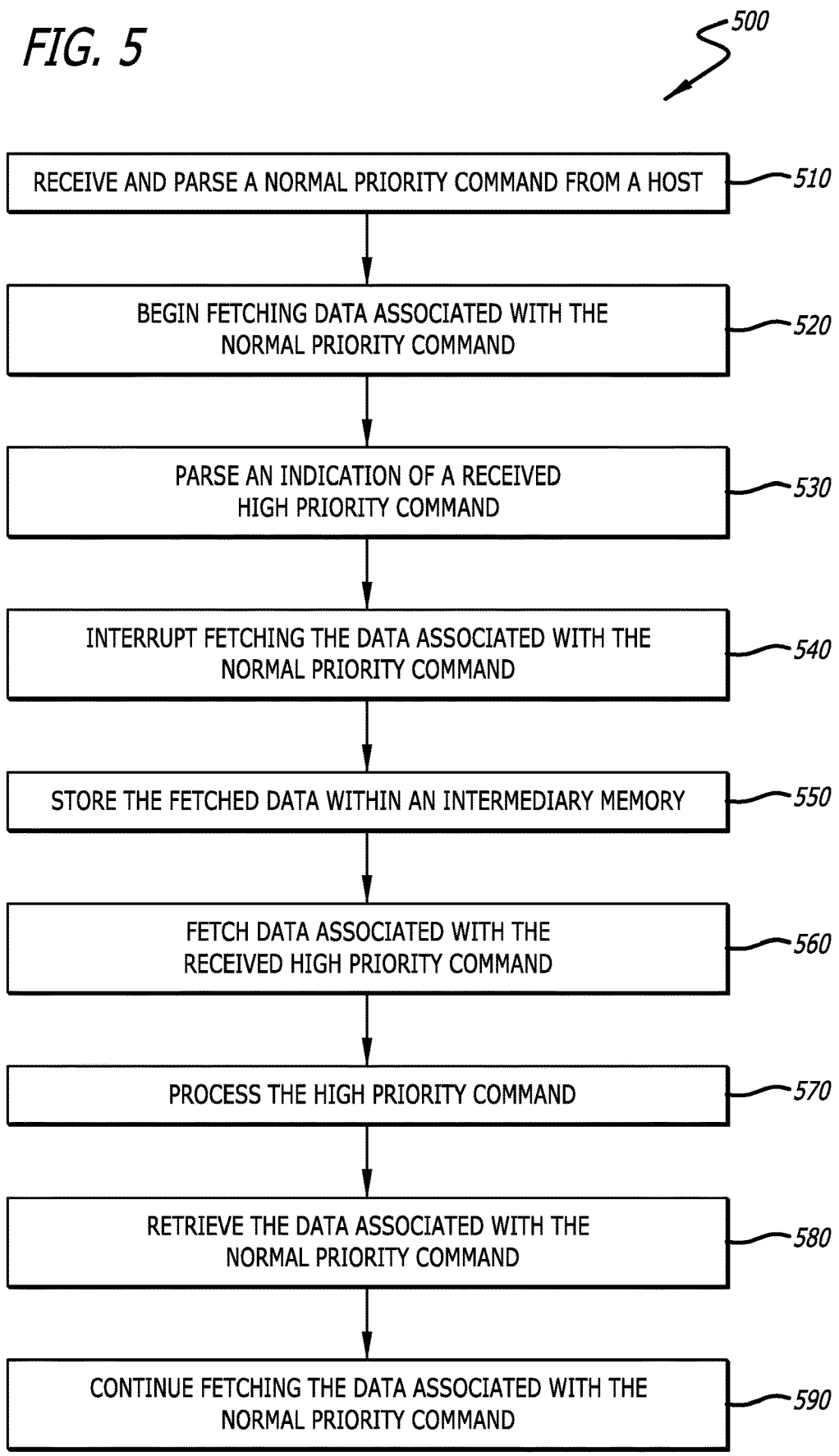

SYSTEMS AND METHODS FOR PRIORITY COMMAND DATA FETCHING MANAGEMENT

FIELD

The present disclosure relates to storage devices. More particularly, the present disclosure relates to managing the processing of high priority commands received during the transfer of non-priority data.

BACKGROUND

Storage devices are ubiquitous within computing systems. Recently, solid-state storage devices have become increasingly common. These nonvolatile storage devices can communicate and utilize various protocols including non-volatile memory express (NVMe), and peripheral component interconnect express (PCIe) to reduce processing overhead and increase efficiency. As these storage devices have matured, data transfer and processing speed demands have also increased, requiring shorter and shorter latency periods between command and operation processing within the storage device.

While current storage device architectures have dedicated queues for specific input/output (IO) commands that the host directs for execution, many protocols have no system to indicate priority within these queues. For example, a host may desire for a specific IO command to execute before another, previously provided command. The size of data associated with commands has also increased over the years. As command data from the host increases in size, the amount of time needed to fetch that data has also increased. However, a high priority command received at the start of the normal priority command data transfer will have to wait for that normal priority command data to be transferred, no matter how long that may be.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart depicting a process for priority command data fetching management in accordance with an embodiment of the disclosure; and FIG. 5 is a flowchart depicting another process for priority command data fetching management in accordance with an embodiment of the disclosure.

Figure 1:
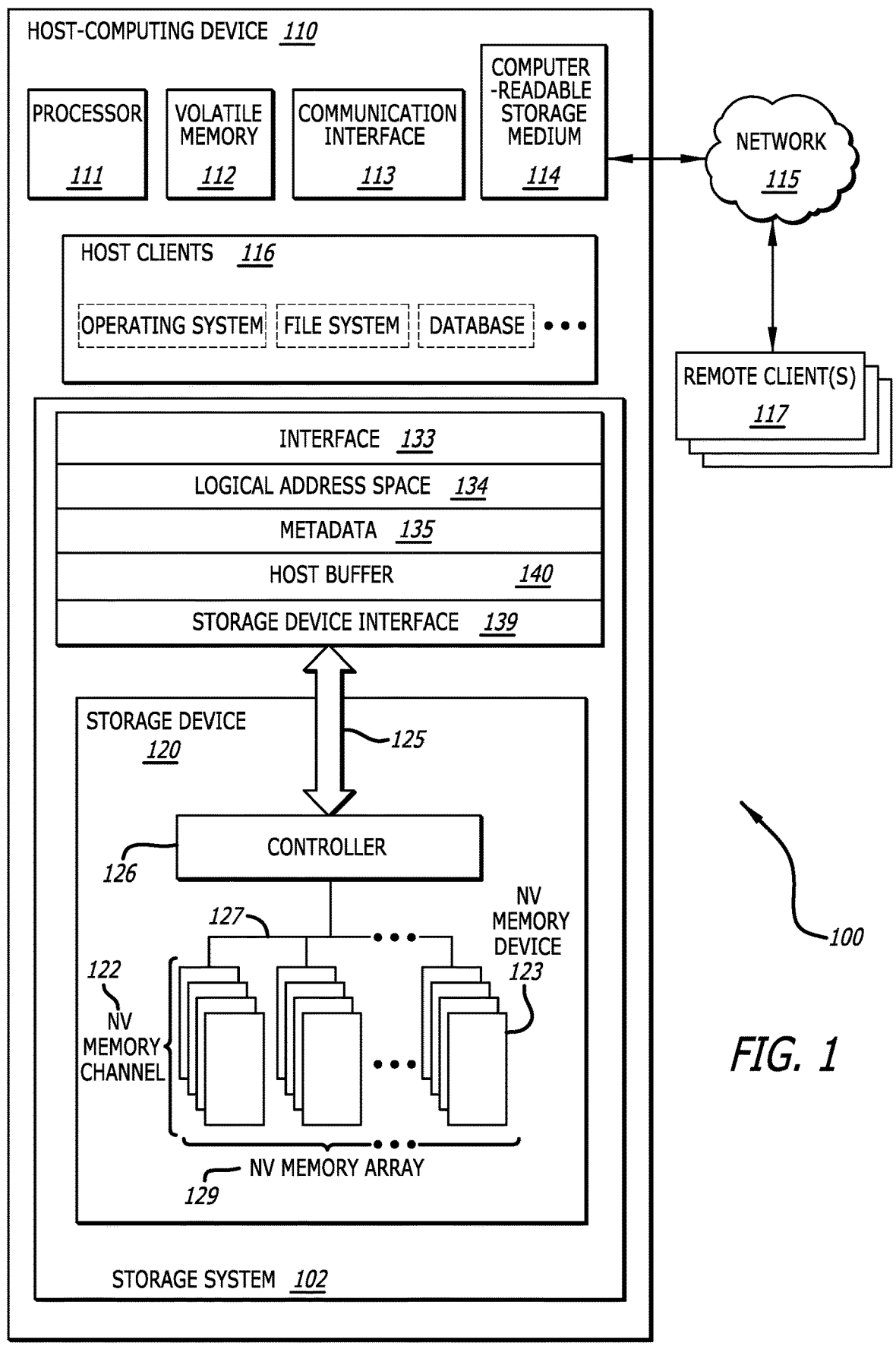
FIG. 1 is a schematic block diagram of a host-computing device with a storage device suitable for priority command data fetching management in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that allow for the interruption of fetching and processing of commands within a storage device in order to immediately process one or more newly received high priority commands. In this way, the time needed to wait for the initial normal priority command to be fetched and/or processed can be avoided, allowing for more immediate processing of the high priority command. As storage devices are being configured with ever higher levels of performance, being able to cut bottlenecks and/or other latencies during operations is becoming more critical.

Many embodiments described herein can be notified of the arrival of a new high priority command through various means described in more detail below. Once notified, the storage device can make an analysis on the current state of its operations. In a number of embodiments, the analysis will determine that better performance can be obtained if the current fetch and/or processing command being completed by the storage device is interrupted in favor of processing the high priority command. In certain cases, this analysis can examine the projected time that it will take to complete fetching the non-high priority commands being processed. In further embodiments, the analysis can simply compare the current state of the fetch process to a predetermined value that indicates a point at which an interruption should be made.

Once the interruption of the current normal priority fetch and/or processing has been completed, the data that has already been fetched and/or processed can be dumped or stored within one or more intermediary memories. In certain embodiments, the storage device may have enough processing memory available such that dumping or moving of the fetched data isn't necessary and simply requires a deactivation, partition, or other demarcation to denote the association of the data to the normal priority command.

The high priority command data can then be fetched and processed as intended. Upon completion of the available high priority commands, normal operations may resume. However, the interrupted operation may require completion before normal operations resume. When the previously fetched data was dumped, the storage device can simply re-fetch the normal priority command data in its entirety. For embodiments that stored the fetched data, it may be retrieved, reactivated, or otherwise made available again to the storage device. The remaining portion of unfetched data may now be fetched for processing. In further embodiments, the subsequently fetched data can be appended onto the previously fetched data. In other embodiments, the subsequently fetched data may be stored in one location while the previously fetched data is stored in a second location. In these cases, the storage device would have to process the data as if it were physically located together.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device with a storage device suitable for priority command data fetching management in accordance with an embodiment of the disclosure is shown. The control block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, a buffering component may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The storage system 102 may further include a host buffer 140. The host buffer 140 may be configured to receive and store data from a storage device 120. In certain embodiments, the data transfer may be realized through direct memory access (DMA) protocols. In certain embodiments, the host buffer 140 may be configured as a secure memory buffer or a host memory buffer (HMB) corresponding to the NVMe protocol. In many embodiments, the host buffer 140 may be configured with one or more queues that can be utilized by the host to store commands which can then be processed by the storage device. In still yet further embodiments, the host buffer 140 may be located remotely as part of one or more remote clients 117.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
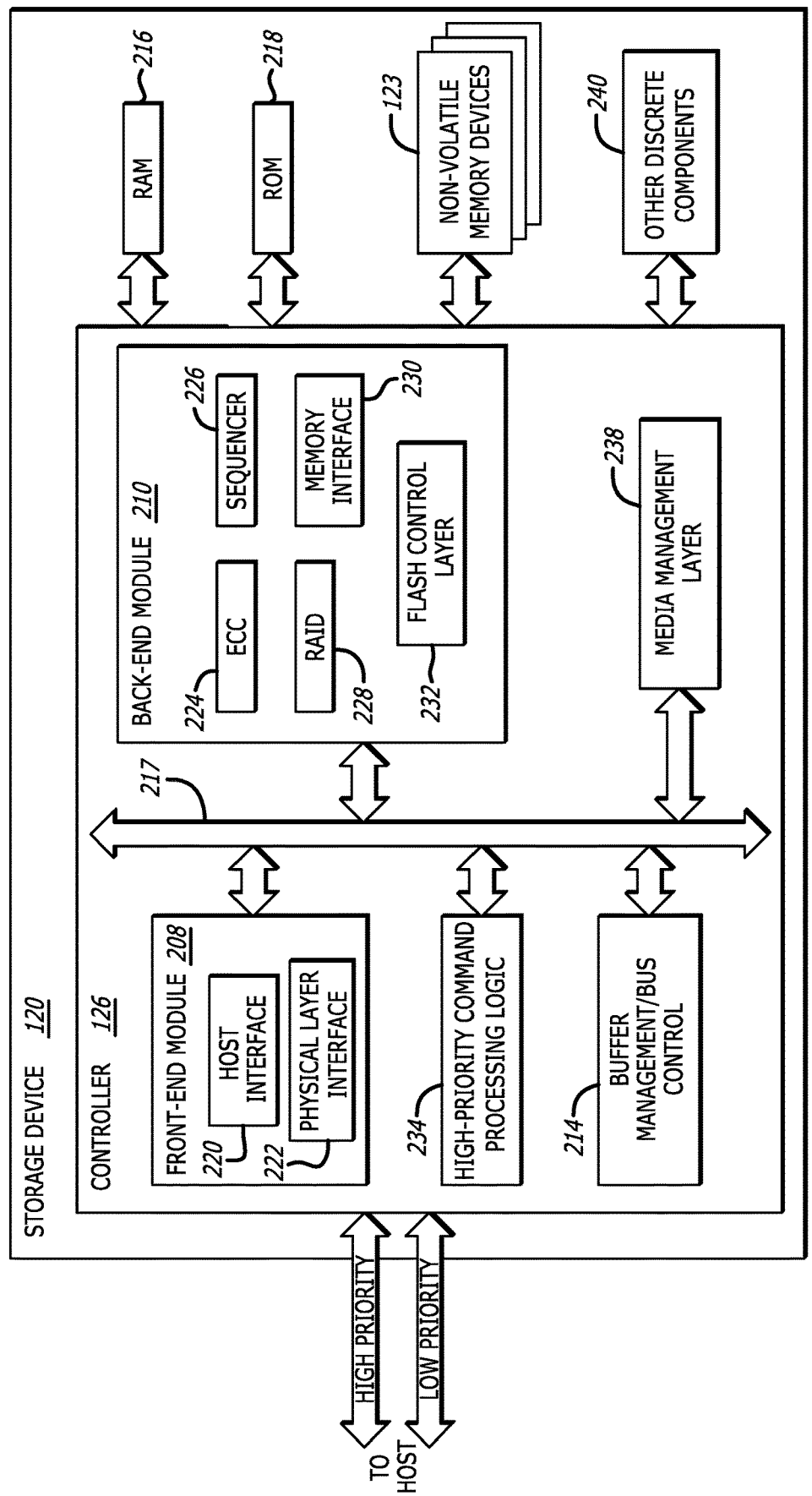
FIG. 2 is a schematic block diagram of a storage device suitable for priority command data fetching management in accordance with an embodiment of the disclosure.

Referring to FIG. 2, a schematic block diagram of a storage device suitable for priority command data fetching management in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Example types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a high-priority command processing logic 234. In many embodiments the high-priority command processing logic 234 can be configured to facilitate the operations of newly received high priority commands. In many embodiments, the high-priority command processing logic 234 monitors changes or notifications within the system that may indicate that a new high priority command has been received. Methods of detecting newly received high priority commands are described in more detail below with respect to FIGS. 4 and 5.

In some embodiments, the high-priority command processing logic 234 may also process an analysis on the state of current operations with the storage device. When a new high priority command is received, a determination can be made on whether to interrupt a current normal priority command fetch and/or processing. The high-priority command processing logic 234 may have access to data that indicates the potential performance penalties that can occur depending on whether the normal priority operations are ceased versus if they are allowed to be carried out. This analysis data may include a list of preprogrammed values, historical data fetch times per queue or size of command data, and/or a dynamic combination of the two.

Figure 3:
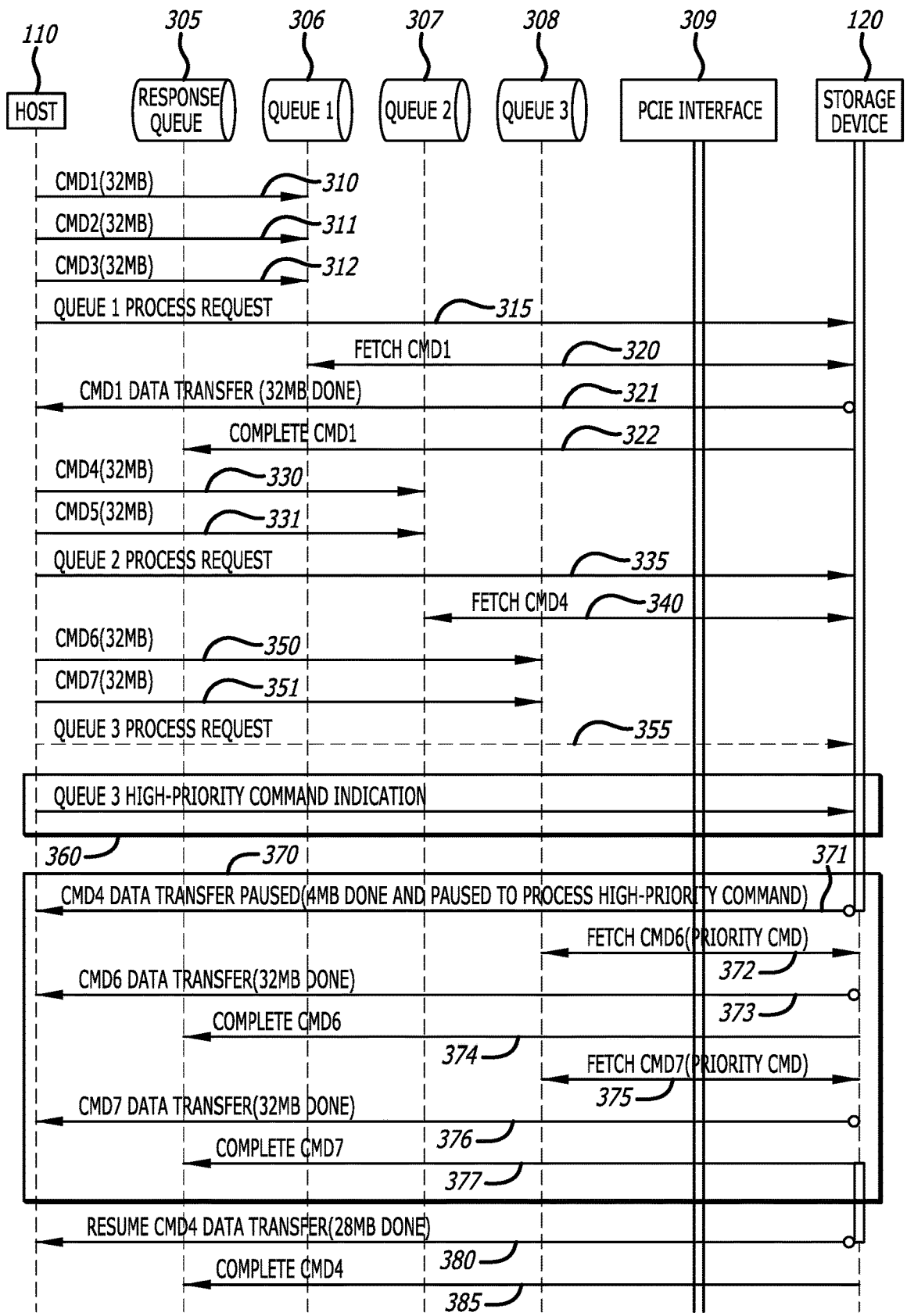
FIG. 3 is a conceptual timing diagram showing the interactions between a host-computing device and a storage device utilizing priority command data fetching management in accordance with an embodiment of the disclosure.

Referring to FIG. 3, a conceptual timing diagram showing the interactions between a host-computing device 110 and a storage device 120 utilizing priority command data fetching management in accordance with an embodiment of the disclosure is shown. The embodiment depicted in FIG. 3 is simplified to help facilitate an understanding of the concepts described herein that pertain to the embodiments of the disclosure. The timing diagram indicates communication between the host-computing device 110 and the storage device 120 wherein the start of the timing diagram is at the top of the figure and represents a flow of time as items shown lower on the timing diagram occur after events higher up on the diagram.

The host-computing device 110 (shown as "host" in FIG. 3) may comprise a plurality of queues such as queue 1 306, queue 2 307, queue 3 308, and a response queue 305 configured to receive command completions from the storage device 120. A PCIe Interface 309 item is shown within the timing diagram to indicate the transmission of data across one or more PCIe data pathways. It will be recognized by those skilled in the art that a great number of configurations of the host-computing device 110 may be possible and is not limited to the embodiments discussed herein. For example, in various embodiments, one or more queues 306, 307, 308 can be request queues.

The communication between the host-computing device 110 and the storage device 120 can begin by the issuance of various normal priority commands 310, 311, 312 (shown as CMD1, CMD2, and CMD3 respectively). Upon completion of transfer into queue 1 306, the host-computing device 110 can issue a queue 1 process request 315 to the storage device 120. In many embodiments, this queue 1 process request 315 can indicate to the storage device 120 that the contents of queue 1 306 should be processed normally.

Once processed, the storage device 120 can issue a fetch command for command 1 320 to begin transfer of the data associated with command 1 310. In the embodiment depicted in FIG. 3, the command data is thirty-two megabytes in size, but may vary in other embodiments. The command 1 data transfer 321 may be acquired directly from the host-computing device 110 in various embodiments. However, in additional embodiments, the data may be transferred from another location, buffer, or communication channel. Upon completion, a command 1 completion signal 322 is sent from the storage device 120 to the response queue 305 indicating that the command has been processed.

The host-computing device 110 may subsequently add a command 4 330 and command 5 331 to the queue 2 307 (shown as CMD4 and CMD5 respectively). Again, upon completion of this transfer, a queue 2 process request 335 can be sent from the host-computing device 110 to the storage device 120. In response, the storage device 120 can issue a fetch command for command 4 340. Prior to fetching the relevant data for command 4, the host-computing device 110 in the embodiment depicted in FIG. 3 adds a command 6 350 and command 7 351 to queue 3 308 (shown as CMD6 and CMD7 respectively). Again, once completed, a queue 3 process request signal 355 is sent from the host-computing device 110 to the storage device 120.

However, queue 3 308 has been internally designated within the host-computing device 110 as comprising priority commands. To notify the storage device of this, a queue 3 high priority command indication signal 360 is sent from the host-computing device 110 to the storage device 120. This queue 3 high priority command indication signal 360 will be parsed by the storage device 120. During that parsing, the storage device begins fetching the command 4 data 371. However, once the queue 3 high priority command indication signal 360 has been parsed, a series of high priority operations 370 will occur.

The first action will be to pause the fetching of the command 4 data 371. In the embodiment depicted in FIG. 3, the storage device 120 has fetched a total of 4 megabytes of the 32 total megabytes associated with command 4. Various methods of how to handle the already fetched data will be discussed in FIGS. 4 and 5 below. In some embodiments, the fetched data can be discarded. In other embodiments, the fetched data can be stored or held in an intermediary memory until it is ready to be processed later. In still additional embodiments, the storage device 120 may decide that fetching of the non-priority command data should continue before processing the priority command.

The storage device will then continue processing the high priority operations 370. A fetch command 372 will be issued for command 6. The data associated with command 6 will be transferred from the host-computing device 110 to the storage device 120. In certain embodiments, the storage device 120 can process data such as performing a data fetch or transfer of thirty-two megabytes 373 to the host-computing device 110. The storage device may then process the command 6 completion and issue a completion notification 374 to the response queue 305 of the host-computing device 110.

Similarly, the storage device 120 may then begin fetching command 7 data 375 from queue 3 308. Upon completion of data transfer, the storage device 120 can process data such as performing a data fetch or transfer of thirty-two megabytes 376 to the host-computing device 110. Command 7 can then be processed by the storage device 120. Once completed, a completion notification 377 can be sent to the response queue 305 of the host-computing device 110 to indicate that command 7 is now finished processing, which ends the high priority operations 370.

The storage device 120 can now resume normal and/or interrupted operations that were in process prior to the arrival of the high priority commands. In the embodiment depicted in FIG. 3, the storage device 120 can resume fetching command 4 data and issue a completion notification 380 once the remaining data has been fetched. Command 4 can then be processed by the storage device 120, and a completion notification 385 can be sent to the response queue 305 of the host-computing device 110.

It is contemplated that specific implementation of the timings, communication methods, and order may vary between various embodiments depending on their design and/or desired applications. The conceptual timing diagram depicted in FIG. 3 is simplified to illustrate the ability to pause fetching operations mid-download in order to process newly arrived/recognized high priority commands. By pausing these operations mid-fetch or processing, wait times and other latencies may be reduced which can help increase overall storage device performance.

Referring to FIG. 4, a flowchart depicting a process 400 for priority command data fetching management in accordance with an embodiment of the disclosure is shown. Often, the process 400 begins with a storage device establishing one or more communication channels with a host-computing device (block 410). In many embodiments, the communication channels can be established through a PCIe interface. As those skilled in the art will recognize, the PCIe interface may utilize multiple parallel channels of communication in certain configurations.

The storage device can begin to receive and parse a variety of commands from the host including normal priority commands (block 420). Once received, data associated with the normal priority commands may be fetched from the host-computing device (block 430). In some embodiments, during the fetching process, the storage device may receive and/or parse an indication that a high priority command is now available for processing (block 440). In various embodiments, there are different ways that the storage device may be alerted to the arrival of a new high priority command.

In a number of embodiments, the high priority indication could be encapsulated within the command itself. In these cases, the receiving and parsing of the command itself will be configured to notify the storage device controller that a new high priority command is present for immediate processing. In additional embodiments, a specialized high-priority command queue may be allocated which would automatically indicate the priority of the commands within the queue. In this way, in an alternative embodiment of the one depicted in FIG. 3, queue 3 could be assigned as a high priority queue which would not require a subsequent notification to the storage device that the commands within that queue 3 were high priority; the mere presence (or reception of a queue process request) of a command for processing within the queue itself would serve as a notification to the storage device.

Other methods of notifying the storage device to the presence of a high priority command include adding a new data structure to the protocol utilized between the host-computing device and the storage device. For example, various embodiments may deploy a new primitive type which can be used to indicate the arrival of a high priority command. Likewise, the addition of a new register may also provide a method of indicating a high priority command arrival based on the writing to the register.

Once notified of the arrival of a high priority command, the process 400 can then interrupt the fetching of the data associated with the normal priority command (block 450). In certain embodiments, an analysis may be performed by the storage device prior to interruption. In certain cases, a majority of the data to be fetched for the normal priority command may have already been fetched and thus stopping the fetch process may add more latencies or other negative effects to the performance of the storage device than performing an interrupt.

In certain embodiments, this analysis may access data related to historical data processing and fetching times to better estimate the time required to complete the fetch process. In further embodiments, the storage device may be programmed with a fixed percentage or time allowed for finishing a non-high priority command fetch before interruption. In still more embodiments, there may be various levels of high priority that request an interruption of non-high priority operations, and one class of high priority requires an immediate interruption without further analysis, and a second class of high priority which allows for an analysis to be performed prior to interruption.

In various embodiments, the storage device can dump the previously fetched data associated with the normal priority command (block 460). This dumping can be a data erasure, deallocating, or otherwise demarcating the fetched data such that it is not useful anymore. Once dumped, the storage device can begin to fetch any data associated with the received high priority command (block 470). In most embodiments, this fetching process is similar to the fetching process utilized for non-high priority commands. Once fetched, the high priority command can be processed as intended (block 480).

Upon completion of the available high priority commands, the storage device may attempt to resume normal operations. For embodiments such as process 400, the previously fetched data was discarded so the storage device can then restart fetching the data associated with the normal priority command (block 490). Once fetched, this normal priority command can be processed, and normal operations may resume. However, as described below, there are other methods of handling normal priority fetched data when a high priority command is received.

Referring to FIG. 5, a flowchart depicting another process 500 for priority command data fetching management in accordance with an embodiment of the disclosure is shown. As with the embodiment described in FIG. 4, the process 500 often comprises a host-computing device in communication with a storage device. The storage device is tasked with receiving and processing various normal priority commands from the host as part of normal operations (block 510). Once a normal priority command has been received, the data associated with that command can begin being fetched (block 520).

However, during the fetching process, the storage device can receive and/or parse an indication that a high priority command has been received (block 530). As discussed above with respect to FIG. 4, there are a variety of methods that the storage device may be notified that a new high priority command has been received for immediate processing. These methods may include, but are not limited to, encapsulating the command priority within the command itself, creating a specific high priority queue, adding a new data structure to the protocol such as a primitive, or adding a new register which can indicate a high priority command arrival upon writing to that register.

The recognition that a high priority command has been received can lead to an interruption of the fetching of data associated with the normal priority command (block 540). As discussed above, in certain embodiments there may be one or more analyses that occur prior to the interruption as one or more scenarios may allow for a choice between interrupting or not interrupting the data fetching process. However, unlike process 400 of FIG. 4, the storage device may instead store the fetched data associated with the normal priority command within one or more intermediary memories (block 550). In some embodiments, there may not be a requirement to store or process the fetched data. In these cases, there may be enough memory directly available to the storage device such that it may simply partition or demarcate the fetched data from the high priority command data that may be fetched later.

Upon storing or otherwise setting aside the previously fetched data associated with the normal priority command, the storage device can begin to fetch the data associated with the high priority command (block 560). Upon completion of this fetching process, the high priority command can be processed as desired (block 570). Once all high priority commands are completed, the storage device can retrieve the previously fetched data associated with the normal priority command (block 580). In various embodiments, this may mean simply making the previously fetched data active again. In additional embodiments, the previously fetched data requires a transfer from one or more intermediary memories before further fetching can resume. However, in certain embodiments, the storage device can continue fetching the data associated with the normal priority command (block 590). This subsequently fetched data may be combined with the retrieved fetch data such that the complete normal priority command data is available for processing. Once processed, normal operations within the storage device can resume until a next high priority command is received.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
a processor;
a memory array comprising a plurality of memory devices; and
a priority command processing logic configured to:
receive a plurality of processing commands from a host device;
parse a normal priority command;
begin fetching data associated with the normal priority command;
parse a high-priority command;
in response to a determination that a time required to complete the fetching data associated with the normal priority command exceeds a predetermined allowed time, pause fetching of the data associated with the normal priority command;
process fetched data associated with the normal priority command;
wherein processing the fetched data associated with the normal priority command comprises dumping the currently fetched data;
fetch data associated with the high-priority command;
process high-priority command; and
restart fetching of data associated with paused normal priority command,
wherein a command is configured to be indicated high-priority by a high-priority indication, and wherein one or more queues are configured to be indicated either normal priority or high priority.

2. The device of claim 1, wherein processing the fetched data associated with the normal priority command comprises storing the currently fetched data within an intermediate memory.

3. The device of claim 1, wherein the high-priority command is parsed via an encapsulated priority level within a received processing command.

4. The device of claim 1, wherein the high-priority processing command is received from a high-priority command queue.

5. The device of claim 1, wherein the device is notified of the arrival of a high-priority command via a primitive within a communication protocol.

6. The device of claim 1, wherein the device is notified of the arrival of a high-priority command via a change in a high-priority register.

7. A method of processing high-priority commands, comprising:
receiving a plurality of processing commands from a host device;
parsing a normal priority command;
beginning to fetch data associated with the normal priority command;
determining the arrival of a high-priority command;
in response to a determination that a time required to complete the fetching data associated with the normal priority command exceeds a predetermined allowed time, pausing fetching of the data associated with the normal priority command;
processing fetched data associated with the normal priority command;
wherein the processing of the fetched data associated with the normal priority command comprises dumping the currently fetched data;
fetching data associated with the high-priority command;
processing high-priority command; and
restarting fetching of data associated with paused normal priority command,
wherein a command is configured to be indicated high-priority by a high-priority indication, and wherein one or more queues are configured to be indicated either normal priority or high priority.

8. The method of claim 7, wherein determining the arrival of a high-priority command comprises processing an encapsulated priority level within a received processing command.

9. The method of claim 7, wherein determining the arrival of a high-priority command comprises receiving a command from a high-priority command queue.

10. The method of claim 7, wherein determining the arrival of a high-priority command comprises receiving a specialized data structure within a communication protocol.

11. The method of claim 10, wherein the data structure is a primitive.

12. The method of claim 7, wherein determining the arrival of a high-priority command comprises recognizing a change within a high-priority register.

13. A device comprising:
a processor;
a memory array comprising a plurality of memory devices; and
a priority command processing logic configured to:
receive a plurality of processing commands from a host device;
parse a normal priority command;
begin fetching data associated with the normal priority command;
wherein the proper procedure is determined to be dumping the currently fetched data;
parse a high-priority command;
in response to a determination that a time required to complete the fetching data associated with the normal priority command exceeds a predetermined allowed time, pause fetching of the data associated with the normal priority command;
determine proper procedure for processing fetched data associated with the normal priority command;
restart fetching of data associated with paused normal priority command;
process the fetched normal priority command; begin fetching data associated with the high-priority command; and
process the fetched high-priority command;
wherein a command is configured to be indicated high-priority by a high-priority indication, and wherein one or more queues are configured to be indicated either normal priority or high priority.

14. The device of claim 13, wherein the proper procedure is determined to be:
- restarting the fetching of data associated with paused normal priority command; and
- processing the fetched normal priority command prior to fetching and processing the high-priority command.

15. The device of claim 13, wherein the proper procedure is determined to be:
- restarting the fetching of data associated with paused normal priority command; and
- processing the fetched normal priority command after the fetching and processing of the high-priority command.

16. The device of claim 13, wherein the proper procedure is determined to be:
- re-fetching the data associated with paused normal priority command; and
- processing the fetched normal priority command.

17. The device of claim 13, wherein the determination of the proper procedure is based upon the size of the data associated with the normal priority command.

18. The device of claim 13, wherein the determination of the proper procedure is based upon the estimated latency of completing the fetching of the data associated with the normal priority command.

* * * * *